(12) United States Patent
Steinmetz et al.

(10) Patent No.: US 9,890,817 B2
(45) Date of Patent: Feb. 13, 2018

(54) METHOD FOR PRODUCING A FRICTION BODY

(71) Applicant: Schaeffler Technologies AG & Co. KG, Herzogenaurach (DE)

(72) Inventors: Stefan Steinmetz, Essingen (DE); Constanze Franke, Bonn (DE); Markus Hesse, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 121 days.

(21) Appl. No.: 13/910,192

(22) Filed: Jun. 5, 2013

(65) Prior Publication Data

US 2013/0270059 A1 Oct. 17, 2013

Related U.S. Application Data

(63) Continuation of application No. PCT/DE2011/001998, filed on Nov. 17, 2011.

(30) Foreign Application Priority Data

Dec. 13, 2010 (DE) .............. 102010054265

(51) Int. Cl.
*F16D 13/64* (2006.01)
*B32B 38/00* (2006.01)
*F16D 69/02* (2006.01)
*F16D 69/04* (2006.01)

(52) U.S. Cl.
CPC .......... *F16D 13/64* (2013.01); *B32B 38/0012* (2013.01); *F16D 69/025* (2013.01); *F16D 69/026* (2013.01); *F16D 69/04* (2013.01); *F16D 13/648* (2013.01); *F16D 2069/0441* (2013.01); *F16D 2069/0466* (2013.01); *F16D 2069/0475* (2013.01); *F16D 2069/0483* (2013.01); *Y10T 156/1044* (2015.01)

(58) Field of Classification Search
CPC ......... F16D 2069/001; F16D 2069/005; F16D 13/683; F16D 2069/008; B32B 2475/00
USPC ......................................................... 156/222
See application file for complete search history.

(56) References Cited

U.S. PATENT DOCUMENTS

| | | | |
|---|---|---|---|
| 2,849,346 A * | 8/1958 | Almen et al. ................... | 156/74 |
| 3,277,226 A * | 10/1966 | Bockno et al. ............... | 264/198 |
| 3,306,401 A * | 2/1967 | Dasse ...................... | 188/251 M |
| 3,738,901 A | 6/1973 | Matsushima et al. | |
| 3,934,686 A * | 1/1976 | Stimson ................. | F16D 13/64 188/218 XL |
| 4,045,608 A * | 8/1977 | Todd .......................... | 428/300.7 |

(Continued)

FOREIGN PATENT DOCUMENTS

| CN | 101463875 A | 6/2009 |
|---|---|---|
| CN | 101520074 A | 9/2009 |

(Continued)

*Primary Examiner* — Matthew J Daniels
*Assistant Examiner* — Marta S Dulko
(74) *Attorney, Agent, or Firm* — Volpe and Koenig, P.C.

(57) ABSTRACT

A method for producing a friction body, in particular a wet friction disk in a motor vehicle, the friction body turning about a rotational axis during operation. The friction body has a friction area and a connection area and the connection area of the friction body is connected to a friction body carrier. A friction body, in particular a wet friction disc in a motor vehicle, is also provided.

12 Claims, 1 Drawing Sheet

(56) References Cited

U.S. PATENT DOCUMENTS

| | | | | |
|---|---|---|---|---|
| 5,558,186 | A | * | 9/1996 | Hyde ............... F16D 55/40 188/218 XL |
| 5,585,166 | A | * | 12/1996 | Kearsey ................ 428/212 |
| 5,639,804 | A | * | 6/1997 | Yesnik ............... C08L 61/06 523/153 |
| 5,730,259 | A | * | 3/1998 | Umezawa ............ 188/250 G |
| 5,775,468 | A | * | 7/1998 | Lam et al. ............ 188/251 A |
| 5,894,049 | A | * | 4/1999 | Lamport ................ 264/258 |
| 5,975,270 | A | * | 11/1999 | Tokune et al. ........ 192/107 M |
| 6,001,750 | A | * | 12/1999 | Lam ........................ 442/72 |
| 6,042,935 | A | * | 3/2000 | Krenkel et al. ........ 428/307.7 |
| 6,345,711 | B1 | * | 2/2002 | Sullivan .............. 192/107 R |
| 6,479,413 | B1 | * | 11/2002 | Booher ............... F16D 69/026 442/101 |
| 6,524,681 | B1 | * | 2/2003 | Seitz et al. ................ 428/143 |
| 2003/0003286 | A1 | * | 1/2003 | Gruber et al. ........... 428/293.4 |
| 2003/0047285 | A1 | * | 3/2003 | Collis ..................... 156/510 |
| 2005/0266203 | A1 | * | 12/2005 | La Forest et al. ......... 428/66.2 |
| 2007/0029157 | A1 | * | 2/2007 | Roche ................... 192/107 M |

FOREIGN PATENT DOCUMENTS

| | | |
|---|---|---|
| CN | 201636247 U | 11/2010 |
| DE | 102010021722 | 12/2010 |
| EP | 0557657 | 9/1993 |
| GB | 1410863 | 10/1975 |
| JP | 2000213578 | 8/2000 |
| WO | 9964755 | 12/1999 |

* cited by examiner

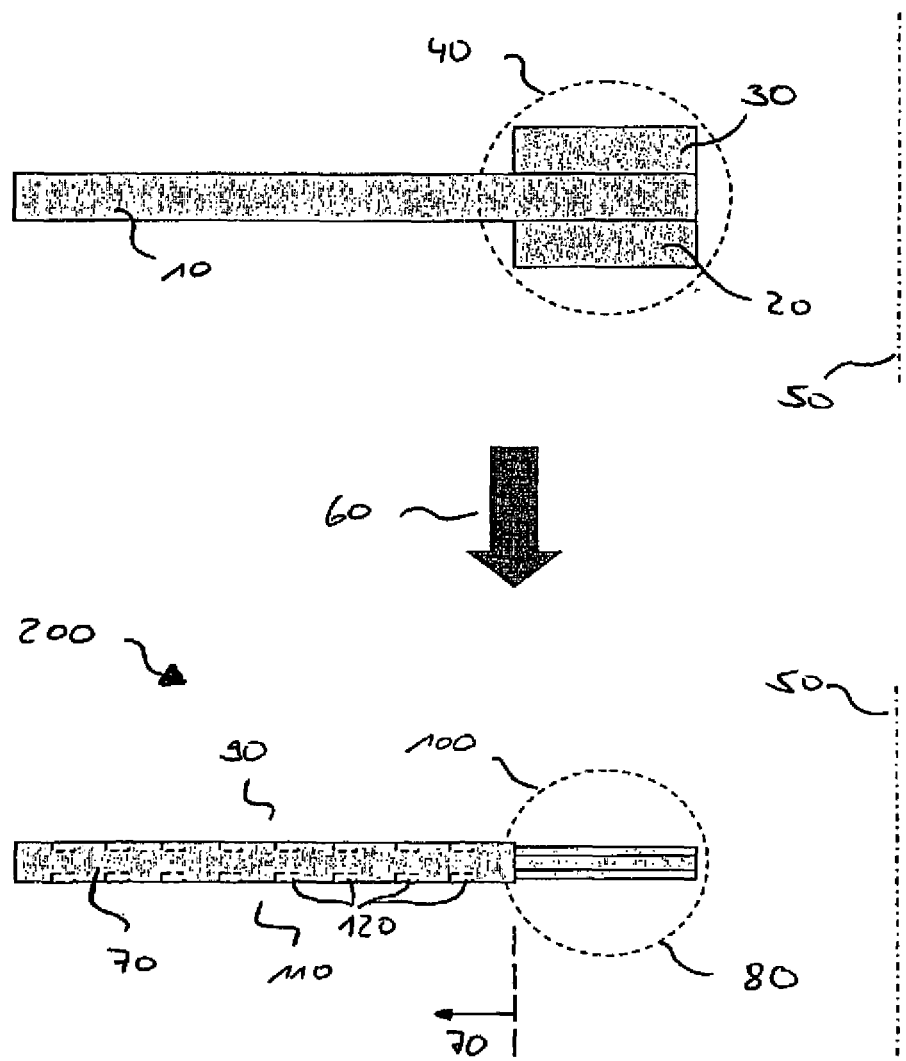

METHOD FOR PRODUCING A FRICTION BODY

INCORPORATION BY REFERENCE

The following documents are incorporated herein by reference as if fully set forth: International Application No. PCT/DE2011/001998, filed Nov. 17, 2011, and German Patent Application No. 102011054265.2, filed Dec. 13, 2010.

BACKGROUND

The invention relates to a method of producing a friction body and also to a friction body.

The field of application and purpose of use of the invention lie in the field of friction lining materials and friction disks for the area of application according to the respective formulation in dry-running or wet-running environments, advantageously as a wet-running lining disk in the area of dual clutches, converters, synchronization, differentials, and automatic transmissions.

EP 0 557 657 A1 discloses the application of a powdery adhesive material onto a metal carrier. The metal carrier is heated so that the adhesive material melts but is not cross-linked. A friction lining is pressed onto the adhesive material with heating and pressure, so that the adhesive is cross-linked and a friction element is produced in this way.

U.S. Pat. No. 3,738,901 A discloses a clutch plate that is operated in oil and has a friction lining made from a felt-like layer. This friction lining is bonded onto a metal carrier.

Typical wet-running linings are produced by paper-making machines and are fixed on a metallic carrier by a bonding process after the complete production—that is, raw paper production and subsequent saturation. The metallic carrier, which usually is a stamped part, here also takes on a torque transfer function by means of a molded inner or outer toothed section.

The disadvantage of this established technology is the number of processing steps, in particular, the coating of the lining or the carrier sheet with the adhesive and the sometimes necessary surface treatment, such as acid cleaning or abrasive blast cleaning, etc. of the carrier. These processing steps cause significant costs in the production of the lining disk.

Another disadvantage is that the metallic carrier materials on the inner or outer disk carrier can cause wear and therefore make expensive heat treatment or coating of the disk carrier necessary.

SUMMARY

The objective of the present invention is to present a simplification of a friction body and also its production process.

This objective is met by a method according to the invention and a friction body according to the invention.

According to the invention, a method is provided for producing a friction body, in particular a wet-running friction disk in a motor vehicle, wherein the friction body rotates about a rotational axis during operation, wherein the friction body has a friction area and a connection area, and wherein the friction body is connected in the connection area to a friction body carrier. According to the invention it is provided that at least two paper blanks, at least in the connection area, are placed one above the other in the axial direction and then are pressed to a first specified thickness in the friction area and to a second specified thickness in the connection area, with heating and reaction of the binding agent contained in the paper blanks to the friction body, wherein the binding agent contained in the paper blanks is still in a reactive state before the pressing, and wherein each paper blank has at least one connection area, and wherein at least one paper blank has an area that is at least part of the friction area after the completion of the friction body.

In one preferred embodiment of the invention, it is provided that the paper blanks are produced by a pulp molding method.

In another preferred embodiment of the invention, it is provided that the paper blanks are in a moist state before the pressing.

In one preferred embodiment of the invention, it is here provided that the pressing is a hot pressing process.

In another preferred embodiment of the invention, it is provided that a drying process is also performed during the pressing, wherein, during the drying, the moisture is discharged as water vapor with the help of vacuum or negative pressure.

In another preferred embodiment of the invention, it is provided that the friction body carrier is a hub or a disk carrier.

In another preferred embodiment of the invention, it is provided that two paper blanks are placed one above the other.

In another preferred embodiment of the invention, it is provided that three paper blanks are placed one above the other.

In another preferred embodiment of the invention, it is provided that a first paper blank that has the friction area of the friction body after the completion of the friction body and also a second and third paper blank are placed one above the other, wherein the first paper blank is arranged axially between the second and third paper blank.

In another preferred embodiment of the invention, it is provided that the paper blanks have different compositions with respect to their formulation.

In another preferred embodiment of the invention, it is provided that the paper blank that has the friction area after the completion of the friction body has a different composition with respect to formulation than the other paper blanks.

In another preferred embodiment of the invention, it is provided that the friction area of the friction body has a smaller thickness than the connection area after the completion of the friction body.

In another alternatively preferred embodiment of the invention, it is provided that the friction area of the friction body has a larger thickness than the connection area after the completion of the friction body.

In another preferred embodiment of the invention, it is provided that the friction body is connected to the friction body carrier by means of teeth.

In another preferred embodiment of the invention, it is provided that the paper blanks have a toothed geometry in the connection area.

In another preferred embodiment of the invention, it is provided that the toothed geometry is formed during the pressing.

In another preferred embodiment of the invention, it is provided that the toothed geometry is formed during the pressing such that subsequent rework is unnecessary.

In another alternatively preferred embodiment of the invention, it is provided that the toothed geometry is formed after the pressing by means of a stamping process.

In another preferred embodiment of the invention, it is provided that the connection area is provided on the friction body on the outside in the radial direction and/or on the inside in the radial direction with respect to the rotational axis.

In another preferred embodiment of the invention, it is provided that the toothed geometry is provided on the friction body on the outside in the radial direction and/or on the inside in the radial direction with respect to the rotational direction.

In another preferred embodiment of the invention, it is provided that the pressing of the paper blanks is performed in an essentially flat, essentially annular shape of the friction body.

Deviating from the annular shape of the friction body, the formed toothed geometry is on the outside in the radial direction or on the inside in the radial direction on the friction body, therefore the text refers to an essentially annular shape of the friction body.

In another preferred embodiment of the invention, it is provided that the pressing of the paper blanks is performed in an essentially conical shape of the friction body.

Deviating from a conical shape of the friction body, the formed toothed geometry is on the outside in the radial direction or on the inside in the radial direction on the friction body, therefore the text refers to an essentially conical shape of the friction body.

In another preferred embodiment of the invention, it is provided that the friction area has at least one friction function surface with surface structure.

In another preferred embodiment of the invention, it is provided that the two friction function surfaces of the friction area have different surface structures.

In another preferred embodiment of the invention, it is provided that the surface structure is a groove geometry.

In another preferred embodiment of the invention, it is provided that the surface structure is formed during the pressing and/or by subsequent grinding.

In another preferred embodiment of the invention, it is provided that the friction function surface is ground after the pressing.

With respect to the device, the objective is met by the device described below.

According to the invention, a friction body is also proposed, in particular, a wet-running friction disk in a motor vehicle, wherein the friction body rotates about a rotational axis during operation, wherein the friction body has a friction area and a connection area, and wherein the friction body can be connected to a friction body carrier in the connection area. According to the invention it is provided that at least two paper blanks are placed one above the other in the axial direction at least in the connection area and are then pressed to a first defined thickness in the friction area and to a second defined thickness in the connection area, with heating and reaction of the binding agent contained in the paper blanks to the friction body, wherein the binding agent contained in the paper blanks is still in a reactive state before the pressing, and wherein each paper blank has at least one connection area, and wherein at least one paper blank has an area that is at least part of the friction area after the completion of the friction body, and wherein the friction body is produced according to a method mentioned above.

According to the method according to the invention, the production of a friction body, for example, a lining disk, can be simplified, because the friction body according to the invention can be produced without a carrier sheet and the associated elimination of the adhesive process and the preparatory steps.

BRIEF DESCRIPTION OF THE DRAWINGS

Additional advantages and advantageous constructions of the invention are the subject matter of the following figure and also its description.

Shown in detail are:

FIG. 1 is a schematic diagram of the production method according to the invention for the friction body.

DETAILED DESCRIPTION OF THE PREFERRED EMBODIMENTS

FIG. 1 shows schematically the production method according to the invention for the friction body.

Below, the terms "connection area" and "toothed area" are understood to be the same; the reference symbols 40 and 100 are allocated to the two terms. Below, the terms "friction area" and "friction function area" are understood to be the same; the reference symbol 70 is allocated to the two terms.

Several—preferably at least two—paper blanks 10, 20, 30 are placed one above the other in the area of the teeth 40 of each paper blank and then pressed 60 with each other to the defined thickness with during and the reaction of the binding agent that is contained in the paper blanks 10, 20, 30 and is not fully reacted, that is, is still reactive in a suitable hot-pressing and drying tool. The binding agent in the paper blanks 10, 20, 30 provides for a rigid connection between the paper blanks 10, 20, 30 after it reacts completely due to the hot-pressing process. The paper blanks 10, 20, 30 are pulp molding blanks, that is, paper blanks that are produced by a pulp molding method. The paper blanks 10, 20, 30 are still moist before the pressing. During the pressing 60, the tool discharges the still contained moisture as water vapor with the help of a vacuum or negative pressure. During the pressing 60, pressing, curing, and drying take place in a single processing step. So that the binding agent is fully reacted, a sufficiently high temperature is provided during the pressing in the hot-pressing and drying tool.

Here, the tool can already form the toothed geometry. The area of the teeth 40 can be selectively on the inside in the radial direction, as shown in FIG. 1, or on the outside in the radial direction—depending on the technical conditions or target specifications. For example, the teeth can be formed for a hub arranged on the inside in the radial direction or for a disk carrier on the outside in the radial direction. The area of the teeth 40 does not extend into the friction function area 70. The respective dimensioning of the toothed area 40, the teeth, and also the friction function area 70 is realized for someone skilled in the art from the technical conditions or target specifications.

The production of the toothed geometry in the toothed area 100 can be implemented such that the blanks 10, 20, 30 already contain the toothed geometry or alternatively such that the pressed parts are subjected after the pressing 60 to a stamping process in a stamping step for the production of the toothed geometry. Alternatively, the toothed geometry can also be discharged directly during the pressing 60.

A pulp molding blank is understood to be a blank that is produced by a pulp molding method known to someone skilled in the art. Such a method is also described in the German Patent Application DE 10 2010 021 722.0. Here, a dispersion made from water and solids is suctioned onto a sieve-like surface, wherein the solids are deposited on the sieve-like structure. The shape of the sieve-like surface is selected so that the resulting blank assumes the desired shape—for example, an annular shape. In this way, stamping residue like that produced according to classical paper-making methods can be avoided in order to obtain the desired shape for the blank. Such a dispersion contains, in addition to water, for example, cotton fiber, aramid fiber, silicon dioxide, phenol resin, and processing aids that are typical for the production of paper.

This solution of the objective according to the invention can be realized by a paper-making machine with conventional papers not at all or only with considerable loss of materials and significant technical changes to the paper-making machine.

For the solution according to the invention, it is necessary that the binding agent is in a still uncured state, that is, in a still reactive, not yet fully reacted state in the paper blanks 10, 20, 30. Only in this way is it guaranteed that two or more paper blanks can be connected to each other with sufficient strength. The paper blanks are preferably still in a moist state before the pressing.

The paper blanks 10, 20, 30 can be made from different materials for achieving optimum toothed characteristics on one hand and an optimum friction performance on the other.

The toothed area 100 can be thicker or thinner than the actual friction function area 70 by means of varying the hot-pressing tool. If the toothed area 100 is thicker than the friction function area 70, stresses can be reduced during operation. If the toothed area 100 is thinner than the friction function area 70, this can be advantageous, for example, with respect to the design of the friction body carrier.

Pulp molding blanks 10, 20, 30 that already contain the binding agent—advantageously a phenol resin—are placed one above the other. The paper blanks 10, 20, 30 can be arranged as shown in FIG. 1 and are then pressed flat 60. The paper blanks 10, 20, 30 can also be pressed into a different final geometric shape, for example, conical.

The first paper blank 10 and the second paper blank 20 or the first paper blank 10 and the third paper blank 30 in FIG. 1 can have different compositions in terms of their formulation. Here, the second and third paper blanks 20 and 30 that have no friction function area 70 and are used only for reinforcing the toothed area 100 have the same composition, while the first paper blank 10 that has the friction function area 70 has a different composition.

It can be processed, in particular, with two or three paper blanks 10, 20, 30, wherein a paper blank has a friction function area 70.

The toothed geometry in the toothed area 40, 100 can already be formed during the pressing 60, without requiring additional reworking.

Alternatively, the toothed geometry could be formed by a stamping process.

Selectively, groove geometry 120 could be formed in the friction function area 70 during the pressing 60 or due to subsequent grinding.

The surfaces 90, 110 can then be finished by grinding.

Selectively, both friction function surfaces 90, 110 could have different groove geometries 120.

Obviously, the paper blank could also be treated—for example, by means of a suitably shaped sieve-like surface in the pulp molding method—such that it already contains more material in the toothed area. Then only one paper blank would be necessary.

The invention can be used advantageously in wet-running dual clutches but also for lining disks for automatic transmissions and converter-type transmissions. It can also be used in the field of synchronization and for lining disks for differentials. Other possible uses are in the field of wet-running motorcycle clutches.

The present invention describes the production of a lining disk without the use of a carrier sheet and the associated bonding process.

LIST OF REFERENCE NUMBERS

10 First paper blank
20 Second paper blank
30 Third paper blank
40 Toothed area of the paper blank
50 Axis
60 Pressing: hot pressing and simultaneous drying
70 Friction functional area
80 Pressed area
90 Friction functional surface
100 Toothed area of the friction body
110 Friction functional surface
120 Groove geometry
200 Friction body

The invention claimed is:

1. A method for producing a friction body, the friction body being adapted to rotate about a rotational axis during operation, the friction body comprising a friction area and a connection area, and wherein the friction body is connected to a friction body carrier in the connection area, the method comprising:
   pulp molding three moist paper blanks including fibers selected from a group consisting of cotton fibers and aramid fibers,
   placing the three moist paper blanks one above the other in an axial direction only in the connection area and then pressing the three paper blanks to a first defined thickness in the friction area and to a second defined thickness in the connection area with heating and reacting of a binding agent contained in the paper blanks to form the friction body,
   discharging moisture from the paper blanks during pressing, the binding agent contained in the paper blanks is still in a reactive state before the pressing, and wherein each of the paper blanks has at least one connection area, only one of the paper blanks has an area that is at least part of the friction area after completion of the friction body, the friction area of the friction body has a larger thickness than a thickness of the connection area after the pressing and the completion of the friction body, and
   installing the friction body in a clutch as a wet-running friction disk in a motor vehicle.

2. The method according to claim 1, wherein the pressing step is a hot-pressing process.

3. The method according to claim 1, wherein during the pressing step, the friction body is also dried, and during the drying, the moisture is discharged as water vapor via a vacuum or negative pressure.

4. The method according to claim 1, wherein the friction body carrier is a hub or a disk carrier.

5. The method according to claim 1, wherein the paper blanks are placed one above the other.

6. The method according to claim 5, wherein a first one of the paper blanks that has the friction area of the friction body after the completion of the friction body and second and third ones of the paper blanks are placed one above the other, wherein the first paper blank is arranged axially between the second and the third paper blanks.

7. The method according to claim 1, wherein the paper blank that has the friction area after the completion of the friction body has a different composition with respect to a formulation thereof than the other paper blanks.

8. The method according to claim 1, wherein the friction body is connected to the friction body carrier by teeth and the friction body has a toothed geometry in the connection area.

9. The method according to claim 1, wherein connection area is provided on the friction body on at least one of an outside in a radial direction or on an inside in the radial direction with respect to the rotational axis.

10. The method according to claim 1, wherein the friction area is defined along a radially outer edge of the friction body and the connection area is defined along a radially inner edge of the friction body.

11. The method according to claim 8, wherein the toothed geometry in the connection area is formed during the pressing step.

12. The method according to claim 8, wherein the toothed geometry in the connection area is formed after the pressing step by stamping.

* * * * *